US 6,694,367 B1

(12) United States Patent
Miesbauer et al.

(10) Patent No.: US 6,694,367 B1
(45) Date of Patent: Feb. 17, 2004

(54) COMMUNICATION CONNECTIVITY INITIALIZATION AND VERIFICATION SYSTEM AND METHOD OF USE

(75) Inventors: Diane M. Miesbauer, Hartland, WI (US); Rita-Fontell Diarrassouba, Menomonee Falls, WI (US); William Golden Blair, Waukesha, WI (US); Dan Paul Quirt, Waukesha, WI (US)

(73) Assignee: GE Medical Technology Services, Pewaukee, WI (US)

(*) Notice: Subject to any disclaimer, the term of this patent is extended or adjusted under 35 U.S.C. 154(b) by 0 days.

(21) Appl. No.: 09/450,970

(22) Filed: Nov. 30, 1999

(51) Int. Cl.[7] ............................................. G06F 15/173
(52) U.S. Cl. ...................... 709/227; 709/203; 709/228; 709/229; 707/10; 707/104
(58) Field of Search ................................. 709/227, 229, 709/203; 707/10, 104; 600/300, 437; 128/920; 340/825; 379/102.01–102.11

(56) References Cited

U.S. PATENT DOCUMENTS

| | | | | |
|---|---|---|---|---|
| 5,694,546 A | * | 12/1997 | Reisman ....................... 705/26 |
| 5,752,042 A | * | 5/1998 | Cole et al. ................... 717/173 |
| 6,029,196 A | * | 2/2000 | Lenz ............................ 709/221 |
| 6,064,990 A | * | 5/2000 | Goldsmith ................... 235/379 |
| 6,094,679 A | * | 7/2000 | Teng et al. .................. 709/217 |
| 6,105,067 A | * | 8/2000 | Batra .......................... 709/102 |
| 6,175,934 B1 | * | 1/2001 | Hershey et al. ............. 700/177 |
| 6,259,442 B1 | * | 7/2001 | Britt et al. ................... 345/721 |
| 6,351,771 B1 | * | 2/2002 | Craddock et al. ........... 370/352 |
| 6,434,572 B2 | * | 8/2002 | Derzay et al. ................. 707/10 |
| 6,574,660 B1 | * | 6/2003 | Pashupathy et al. ........ 709/217 |

* cited by examiner

Primary Examiner—Thomas Lee
Assistant Examiner—Jinsong Hu
(74) Attorney, Agent, or Firm—Ziolkowski Patent Solutions Group, LLC; Michael A. Della Penna; Carl B. Horton

(57) ABSTRACT

A system and method is disclosed for in-field communication connectivity initialization and verification between centralized on-line centers, and a number of in-field subscribing stations. The substations each have associated therewith an in-field product controlled by software which requires periodic upgrading, maintenance, service, and general monitoring. The system and method includes a computer program and a computer data signal embodied in a carrier wave for carrying out the process, which includes submitting customer and product data electronically to a centralized on-line center, which in turn creates a configuration module based on the submitted customer and product data. The configuration module is then transmitted to the subscribing station by the on-line center. The configuration module is loaded into the subscribing station to allow future communications between the on-line center and the subscribing station. After logging off the subscribing station, the on-line center automatically initiates a call-back to the subscribing station and uploads a file from the subscribing station to the on-line center to verify connectivity. If the in-field product is capable of dialing out, the configuration module causes the subscribing station to initiate a dial out test within a predetermined period after disconnection with the on-line center to ensure proper configuration for future automatic communications.

40 Claims, 7 Drawing Sheets

COMMUNICATION CONNECTIVITY INITIALIZATION AND VERIFICATION SYSTEM AND METHOD OF USE

BACKGROUND OF THE INVENTION

The present invention relates generally to remote servicing of in-field products or equipment, and more particularly to, a method and apparatus for verifying valid connectivity between centralized online service centers and remote subscribing stations having the in-field equipment, such as medical diagnostic equipment.

Medical diagnostic equipment and supporting systems, such as medical imaging systems, have become increasing complex in recent years. Examples of such systems include magnetic resonance imaging (MRI) systems, computed tomography (CT) systems, ultrasound and x-ray systems, and positron emission tomography (PET) systems. To add to the complexity of each particular imaging system, many facilities today incorporate a variety of such equipment. In larger facilities, the systems may be networked to permit common management and control. Further, such systems may be networked with a picture archiving and communication system (PACS) for storing digitized image data for subsequent retrieval and reconstruction. Additionally, teleradiology systems involve transmitting digitized image data to remote locations for review and diagnosis by specialized physicians and/or radiologists.

Because medical diagnostic systems are critical elements in the diagnosis and treatment of patients, their use must not be inhibited by a slow response for service or maintenance. Due to the increasing complexity of these systems, trained service personnel are oftentimes not on location with the equipment. Therefore, remote servicing of medical diagnostic equipment has become an important tool in maintaining these systems.

Remote servicing of medical diagnostic equipment has traditionally been performed via voice communication between operations personnel and a centralized servicing facility. Operations personnel would call a remote service facility to report malfunctions and ask questions regarding the proper operation and settings for the equipment. When such queries could not be sufficiently handled by telephone, a service or field engineer was dispatched to troubleshoot the system and provide the needed assistance.

Improvements in computer networks have greatly facilitated the task of offering assistance to medical imaging equipment. In particular, rather than having to call a service center and talking to a technician or engineer, or having to await a return call from the service center, network technologies have facilitated proactive techniques wherein the service center may contact the medical diagnostic equipment to check the status of subscribing equipment. Further advancements have been proposed to provide remote service to medical diagnostic systems in an effort to provide the level of service on a continual and interactive basis as needed by many facilities. In one such system, a service center can interactively receive messages via a network and can respond automatically to the messages if configured correctly. Data required to analyze the state of operation of the medical diagnostic equipment can be transferred during an electronic connection. This technique greatly facilitates identification of system problems, allows questions to be posed to the subscribing service provider, facilities transfer of updates and imaging protocols, and permits standard and customized reports to be transmitted to subscribing systems or stations. The interactive aspect of this technique allows the medical diagnostic facility to remain current on services provided by the centralized service facility and to readily communicate with the centralized service facility.

While such advancements in the provision of remote services to medical diagnostic equipment has greatly enhanced the level of service and information exchange, they are subject to unanticipated connectivity problems and require manual configuration by system engineers. In order to perform this checkout procedure manually on each particular piece of medical diagnostic equipment in the field is slow and labor intensive. That is, in order to initiate connectivity, a field engineer must initiate communication with the service facility and manually provide the data required in order to initiate a connection. An engineer at the centralized facility must then manually create a configuration file and download it to the subscribing station, where the field engineer can install it, and after making an initial connection, both engineers must monitor the connection and ensure the systems are properly configured for valid communication.

In present systems, a field engineer generally requests a connectivity check, but the initial connectivity verification sequence is initiated by the service facility to the subscribing system. Therefore, the field engineer does not have any control when the verification sequence is performed and very well may not be present to troubleshoot when it is actually done. As a result, the completion of the installation and verification functionality may not be performed due to this delay, and the field engineer must then come back another time to complete the installation and verification sequence. If the required connection between the diagnostic equipment and the service facility is inoperative, service requests may not be readily submitted to the service facility and information from the service facility to the diagnostic system may not arrive properly or in a timely manner. Intervention by field engineers or online service engineers at the service facility can detect and correct such problems, however, such detecting and correction is typically only initiated after a needed response has not been received for some period of time. The goal is to set up the equipment so to exchange service information and requests on an interactive basis so that the centralized facility can contact the subscribing station at will and conversely, so that the subscribing station can freely contact the centralized service facility and each can exchange data accurately.

It would therefore be desirable to have a system and technique for automated communications connectivity initialization and verification capable of performing the aforementioned checkout procedure automatically and configure a subscribing station to an online service facility such that future communications can occur automatically with a high level of trust that the system has been validated. It would also be advantageous to have a system that could provide a report to authorized personnel of the status of such an automatic checkout and notify the authorized personnel when a status report is available. It would be advantageous to have a system that is flexible to communicate with the authorized personnel based on a mode of communication as selected by the authorized personnel.

SUMMARY OF THE INVENTION

The present invention provides a system and method to initiate communications between an on-line center and a subscribing station and verify proper connectivity for future automatic communications that overcomes the aforementioned problems.

The present invention includes a technique that includes both hardware and software by which an on-line center, that has access to service software, at a centralized facility, is capable of servicing in-field product remotely. The service software includes software for service, upgrades, maintenance, or any other similar type functions, and the servicing of the in-field product includes general servicing, upgrading, maintaining, repairing, or any other similar type function. A communications link connects the on-line center to one of many subscribing stations, wherein each subscribing station has a computer controlling an in-field product, such as a medical image scanner. When the on-line center is connected to one of the subscribing stations via the communications link, after receiving customer and product data the on-line center automatically creates and sends a configuration module to the subscribing station to configure the subscribing station to automatically receive service/maintenance software thereafter.

In accordance with the process of the invention, a method of initializing communication with in-field product and verifying connectivity includes first submitting customer and product data electronically to a centralized online system and then automatically creating a configuration module at the on-line center based on the submitted customer and product data. Once the configuration module is created, it is transmitted and loaded in the subscribing station to allow future communications between the on-line center and the subscribing station. After logging off the subscribing station, a first call-back is automatically initiated from the on-line center to the subscribing station and a file is uploaded to the on-line center to verify proper connectivity.

In accordance with another aspect of the invention, a networked system is disclosed to initiate communications with an in-field product and configure the in-field product for future automatic call-backs and includes an on-line center node linked to an on-line center having access to at least one database to store customer data and a processor to create a product/customer configuration module. The networked system includes a number of subscribing station nodes, each linked to its own field product and having operational software loaded therein. A communication interface is connectable to the subscribing station node and the on-line center to transfer data. The communication interface includes a computer, such as a laptop for use by a field engineer, having a browser program to link the subscribing station to the on-line center node through an interconnected server node network, such as an internet or an intranet. The communication interface can also include a direct dial-up link, or a telephone and a voice recognition system, for example. Upon initialization and customer data input, which includes field product data, the customer data is transferred from the subscribing station node through the communication interface, and to the on-line center node. After processing by the on-line center, the on-line center sends the created product/customer specific configuration module through the communication interface, and to the subscribing station node to configure the field product automatically for future automatic communications with the on-line center node.

In accordance with another aspect of the invention, a computer data signal that is embodied in a carrier wave represents a set of instructions which when executed by one or more processors, causes the one or more processors to run a connectivity initialization and verification on a field product is disclosed. The instructions include connecting a subscribing station to an on-line center for data transfer and transmitting customer data to the centralized on-line center wherein the customer data is processed and a configuration module is created therefrom. The configuration module is then transmitted to the subscribing station to configure the subscribing station for connectivity verification and allow future automatic communications. The connection between the on-line center and the subscribing station is then disconnected, and after a period, the connection is reconnected in order to verify valid connectivity.

In accordance with yet another aspect of the invention, a computer program stored on a computer-readable storage medium is disclosed which, when executed by one or more computers, will cause the one or more computers to retrieve customer and product data electronically in a centralized on-line center and create a configuration module at the on-line center based on the submitted customer and product data. The configuration module is then transmitted to a subscribing station which has the field product associated therewith. After loading the configuration module into the subscribing station, the subscribing station is then configured to allow future automatic communications between the on-line center and the subscribing station. After logging off the subscribing station, the on-line center automatically initiates a first call-back to the subscribing station and uploads a file therefrom in order to verify connectivity. Optionally, if the in-field product is capable of dial out function, the program causes the computer to initiate a dial out test from the subscribing station to the on-line center within a predetermined time period after disconnection.

Various other features, objects and advantages of the present invention will be made apparent from the following detailed description and the drawings.

BRIEF DESCRIPTION OF THE DRAWINGS

The drawings illustrate the best mode presently contemplated for carrying out the invention.

In the drawings.

DETAILED DESCRIPTION OF THE PREFERRED EMBODIMENT

Figure 1:
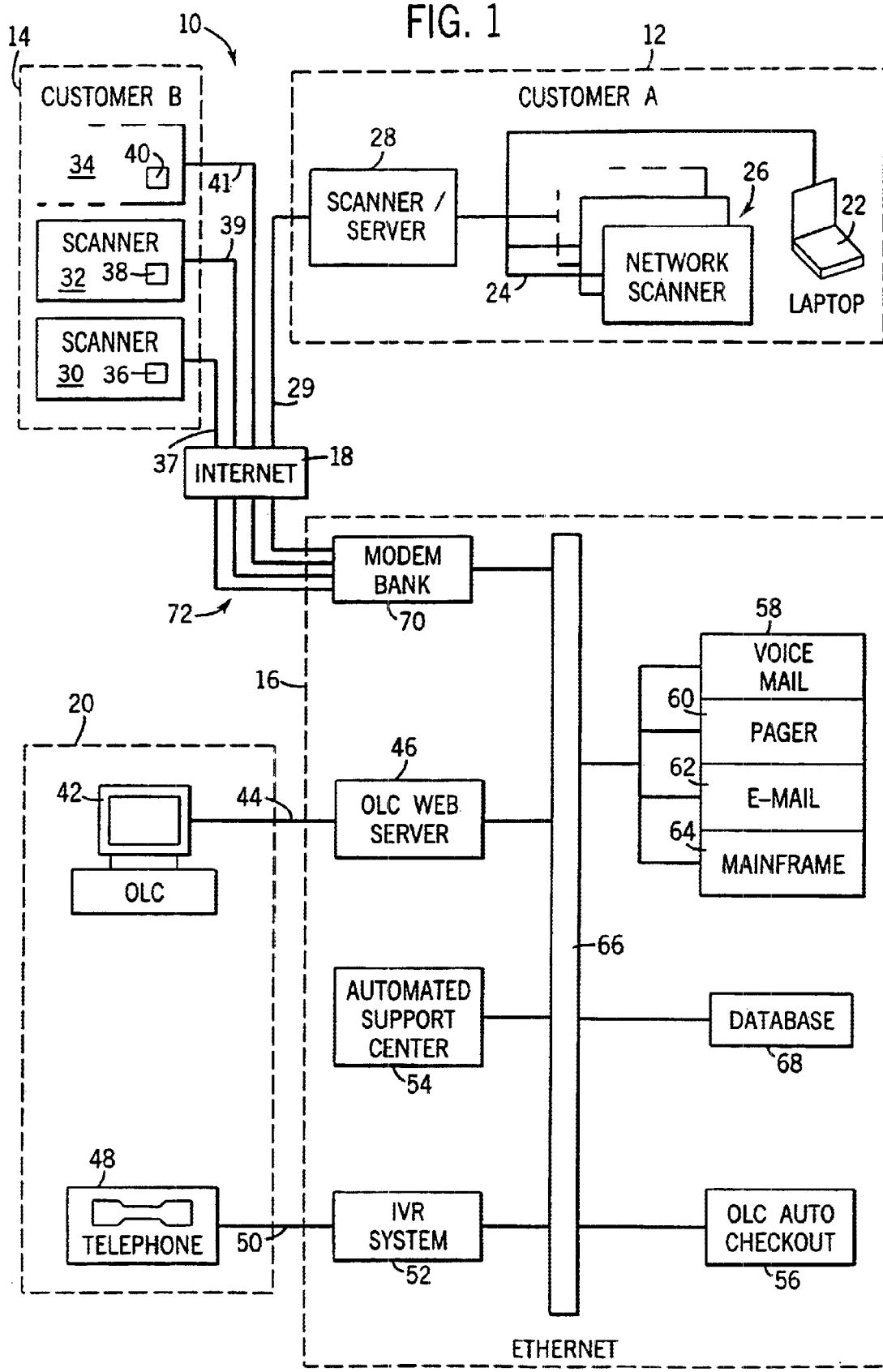
FIG. 1 is a schematic block diagram of a system incorporating the present invention.

Referring to FIG. 1, an overview block diagram of a medical diagnostic and service networked system 10 is shown which includes a plurality of subscribing stations, such as Customer A referenced with numeral 12, and Customer B referenced with numeral 14. It is understood, that the number of subscribing stations can be limitless, but two specific embodiments are shown with Customer A and Customer B, which will be further explained hereinafter. The subscribing stations 12, 14, are connected to an on-line center 16 through a communications link, such as a network of interconnected server nodes 18 or a remote link 20. Although a single on-line center is shown and described, it is understood that the present invention contemplates the use of multiple on-line centers, each capable of communication with each subscribing station. The various systems disclosed are configured to be selectively linked to the on-line center 16 by either the remote link 20, or in the example of subscribing station 12, a laptop computer 22 connected to an internal network 24 of Customer A. Such selective linking is desirable to provide upgrades, maintenance, service, and general monitoring of the various systems and equipment at a customer site, which includes accessing data from the systems and transmitting data to the systems, for example.

In general, a customer site may have a number of in-field products. A subscribing station may include a variety of medical diagnostic systems of various modalities. As an example, in the present embodiment, the in-field products may include a number of networked medical image scanners 26 connected to an internal network 24 served by a single scanner 28 having a work station configured to also act as a server, or configured as a stand-alone server without a medical image scanner associated therewith. Alternately, a subscribing station, or customer site 14 can include a number of non-networked medical image scanners, 30, 32, 34, each having a computer or work station associated therewith and having an internal modem 36, 38, 40 to connect the subscribing station to a communications link, such as in this case, internet 18 through links 37, 38, and 40, respectively, to communicate with the on-line center 16. Each subscribing station has operational software associated therewith which can be configured, serviced, maintained, upgraded, or simply monitored by the on-line center 16.

It is understood that each of the network scanners 26 has its own workstation for individual operation and are linked together by the internal network 24 so that the customer can have a centralized management system for each of the scanners. Further, such a system is provided with communications components allowing it to send and receive data over a communications link 29. Similarly, for the non-networked medical image scanners at subscribing station 14, each of the scanners 30, 32, 34 have individual communications links 37, 39, 41. Although FIG. 1 shows each of these links connected through an open network 18, it is understood that these links can permit data to be transferred to and from the systems over a dedicated network as well.

The embodiment shown in FIG. 1 contemplates a medical facility having such systems as magnetic resonance imaging (MRI) systems, ultrasound systems, x-ray systems, computed tomography (CT) systems, as well as positron emission tomography (PET) systems, or any other type of medical imaging system. Such facilities may also provide services to centralized medical diagnostic management systems, picture archiving and communications systems (PACS), teleradiology systems, etc. Such systems can be either stationary and located in a fixed place and available by a known network address, or be mobile having various network addresses. In the embodiment shown in FIG. 1, each customer subscribing station 12, 14 can include any combination of the aforementioned systems, or a subscribing station may have all of one type of a system. A customer subscribing station can also include a single medical image scanner. Mobile diagnostic systems can be configured similarly to that of subscribing station 12 or subscribing station 14. Such mobile diagnostic systems can include equipment of various modalities, such as MRI, CT, ultrasound, or x-ray systems and are mobilized in order to better service various medical facilities and patients.

The communication connectivity initialization and verification system of the present invention can be initiated by authorized personnel, such as a field engineer or technician, an on-line engineer or technician, administrative personnel, and/or other such similar authorized personnel, from a laptop computer 22 connected to a customer internal network 24, or individually connected to each of the scanners 30, 32, or 34. Similarly, the system can be initialized by a computer or workstation 42 in the remote link 20, which can be a part of the on-line center 16, or be separately connected to the on-line center 16 by a dialup link 44 to a web server 46 in the on-line center 16. The remote link 20 also can serve to connect the on-line center 16 to a subscribing station by a telephone and telephone connection 48 through a conventional telephone network 50 and to an interactive voice recognition system (IVR) 52 in the on-line center 16. The on-line center 16 includes a number of processing systems including computers for the IVR system 52, an automated support center 54, the web server 46, and an auto checkout server 56, for processing customer and product data and creating an appropriate configuration file. Other processor systems include computers to maintain a voicemail system 58, a pager system 60, an email system 62, and a main frame 64, and more generally, an output report generator and notifier. Each is connectable and can transmit data through an ethernet 66 with one another, or with at least one database 68. However, it is understood that the single representation of a database in FIG. 1 is for demonstrative purposes only, and it is assumed that there is a need for multiple databases in such a system, as will be further described hereinafter. It is also understood that the IVR system is not only a voice recognition system, but can also process interactive keypad entry from a touchtone telephone 48. A bank of modems 70 is connected to the ethernet 66 to relay data from the on-line center 16 and to the subscribing stations 12, 14 through a plurality of modem links 72.

As previously discussed each of the systems and substations described herein and referenced in FIG. 1 may be linked selectively to the on-line center 16 via a network 18.

According to the present invention, any acceptable network may be employed whether open, dedicated, virtual private, or so forth. The present preferred embodiment is to utilize an internet open network. Further, the communications links to the network may be of any acceptable type, including conventional telephone lines, cable modem links, digital subscriber lines, and the like. Each of the systems is provided with communications interface hardware and software of generally known design, permitting them to establish network links and exchange data with the on-line center 16. With the present invention, the systems are provided with interactive software so as to configure the systems and exchange data between the subscribing stations and the on-line center 16. In some cases, during periods when no data is exchanged between the subscribing station and the on-line center, the network connection can be terminated. In other cases, the network connection is maintained continuously.

Figure 2:
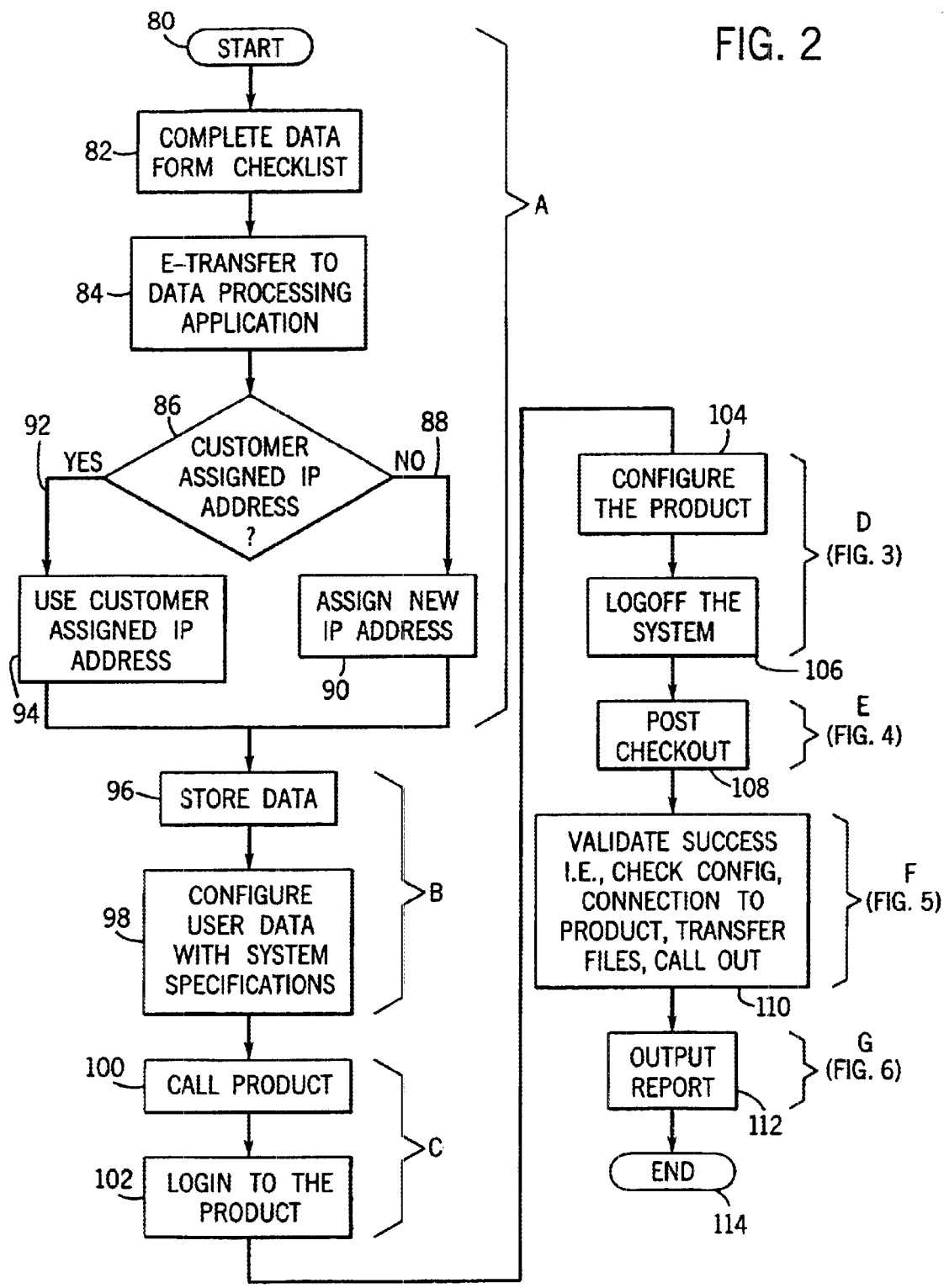
FIG. 2 is a high-level flow chart of the process of the present invention.

FIG. 2 shows a high level process flow chart incorporating and overviewing the present invention which is designed to provide communication connectivity initialization, verification, and reporting. Each of the aforementioned components, referred to in FIG. 1, are specifically designed to enable connections initiating from the subscribing stations 12, 14, or from the remote link 20. In a preferred embodiment, both the on-line center and the subscribing stations include network servers and server software designed to provide for interactive exchange of data via the network link. Such servers may be based on any known or suitable software or protocol for exchanging data. For example, such protocol can include the point-to-point protocol (PPP) employing internet protocol (IP) packets, hypertext transfer protocol (HTTP), or any other data exchange means. Preferably, the servers are designed to process and transfer raw data or processed data, such as image data processed into a standard format. Finally, the servers are preferably equipped to support HTTP applications and include a browser capable of displaying interactive pages, such as those found in HTML, XTL, or other language configurations, and to support JAVA applications, applets, servlets, and similar code for carrying out the functional details of a browser and as described herein.

In general, the flow chart of FIG. 2. is divided into seven subparts. The first subpart is shown as section A, and is the initial setup and the acquisition of data from a subscribing station. The second subpart is shown as subsection B and is data storage. Subsection C includes an initial connection to the product, and subsection D is the configuration of the subscribing station for connectivity, which is described with reference to FIG. 3. Subpart E is a post-checkout connection and subpart F validates the configuration. Each will be explained further with reference to FIG. 4 and FIG. 5, respectively. The last subsection, subsection G, is the compilation of a report and the notification process, as will be further described with reference to FIGS. 6–7.

Referring to FIG. 2 in more detail, upon initialization of this checkout process 80, as initiated by the laptop computer 22, FIG. 1, or by the remote link 20, a data form checklist 82 is filled out by authorized personnel, such as a field engineer, or personnel in the on-line or a dispatch center, to initiate the system. The data checklist includes such information as a system ID identifying the field product, as well as a unique system number identifying that particular piece of equipment, and customer information such as a customer ID and other relevant customer information including whether a signup agreement has been executed and any needed passwords. Further, a system serial number may be input, as well as data on each particular system in a customer's network. Additional information that can be input includes the customer address and room description for the location of the equipment. Required information includes modem data for dialup information, a modem password, any dialing prefix or suffix, as well as area code and telephone number. For IP connections, the IP addresses is input, as well as the portmaster name, the netmask, and the portmaster IP address and password. If appropriate, the product port number is input as well. For each piece of equipment on site at a subscribing station, a login code and a password is input. Any specialized information on system components and configuration may also be desirable. Further, the user, or authorized personnel, can specify when to execute this checkout process at any convenient time, as well as who should receive feedback on the status of the checkout, and what mechanisms should be used to notify the user of its completion.

Once the data is input, it is transferred to a data processing application 84 such as the on-line center auto checkout 56 in the on-line center 16 of FIG. 1. Referring to back to FIG. 2, an initial check is performed as to whether the customer has a preassigned IP address 86, and if not 88, one will be assigned 90 from the on-line center. If the customer has a preassigned IP address 86, 92 the system is setup to use the customer's IP address and the customer and product data are stored in the database of the on-line center 96. The data is then processed 98 and a configuration module is created with the system specifications in order to communicate based on product type, how and when the product was developed, and the customer data. Next, communication with the product is initialized at 100, and using the customer data input at step 82, the on-line center is able to login to the product 102.

Once logged in, the configuration module is transferred to the subscribing station at 104 thus configuring the subscriber station for further communications. After the product is configured so as to identify the subscribing station and the on-line center to one another, the on-line center logs off the subscribing station system 106.

After logging off the system, a post-checkout routine is called at 108, which will be further described with reference to FIG. 4. The success of the communication connection and configuration is validated at 110, which will also be further described, hereinafter, but with reference to FIG. 5. Next, an output report 112 is generated to notify the user or field engineer of the success or failure of the process. The output report will be further described with reference to FIG. 6. After the output report is generated and notification is provided, the communication connectivity initialization, verification, and reporting system of the present invention is complete at 114.

Figure 3:
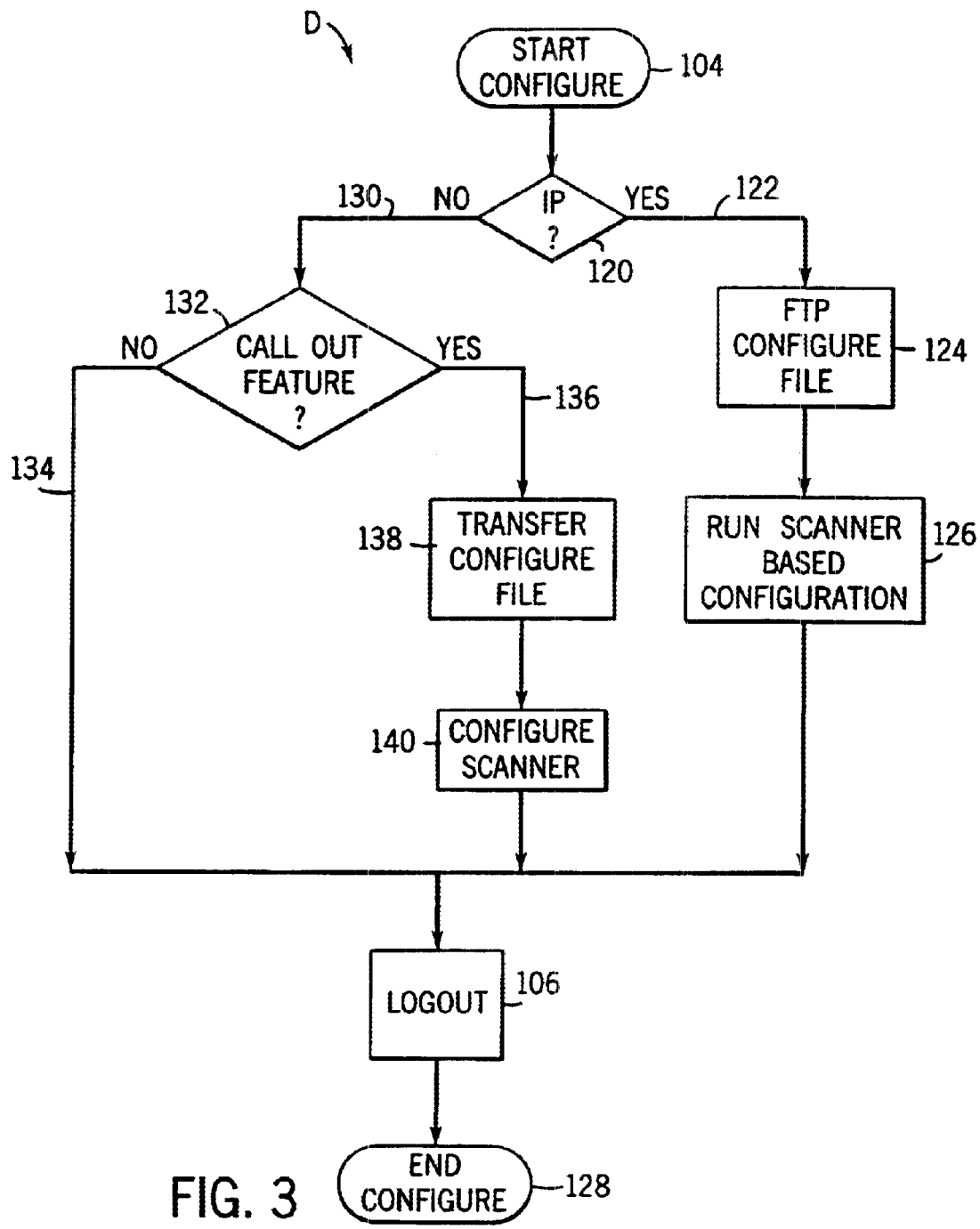
FIG. 3 is a detailed flow chart of a portion of FIG. 2.

Referring now to FIG. 3, subsection D of FIG. 2 is described in more detail. After the configure subroutine is initially called at 104, the IP address is checked at 120, and if the system has an IP address for that specific subscribing station 122, the process configuration file is transferred via the FTP protocol at 124 and the configuration file is executed in the workstation of the scanner at 126, after which, the system disconnects 106 and exists the subroutine at 128. However, if there is no IP address 120, 130, the system checks to see if the particular product has a callout feature so that the product can dial out and communicate with an external system. If it does not 134, the system logs out 106 and the subroutine is complete at 128. If the callout feature is present 132, 136, a dial out is initiated and the configuration file is transferred at 138. Afterwards, the configuration file is executed on the workstation of the scanner at 140 and after configuration, the system signs off at 106 and the subroutine is completed at 128.

Figure 4:
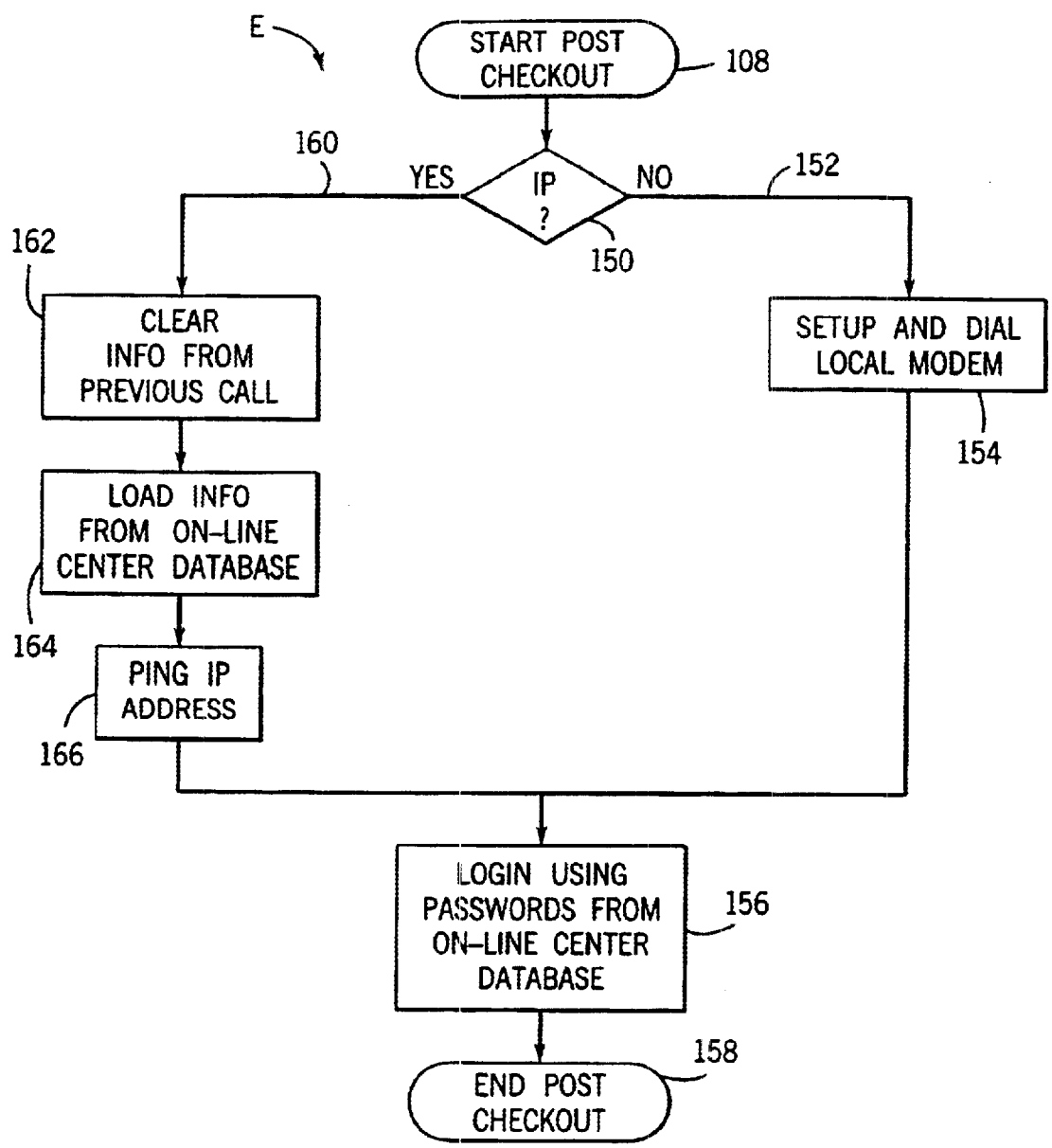
FIG. 4 is a detailed flow chart of a portion of FIG. 2.

Next, referring to FIG. 4, subpart E of FIG. 2. is described in further detail. Upon calling the post-checkout 108, the system again checks to see if a subscribing station is IP based 150, and if not, 152, the on-line center initiates a modem in the modem bank 70, FIG. 1, to dial a local modem at the subscribing station 154, FIG. 4, and then logs in using the passwords previously submitted at 156. Once logged in, the post-checkout process is completed at 158. Conversely, if a subscribing system is IP based 150, 160, the portmaster information is cleared of previous call information at 162 to clear any data from a last call to this particular subscribing station. The postmaster is then loaded from the on-line center database with the customer specific data such as telephone numbers and IP address at 164 and the IP address is then pinged at 166 to confirm and validate a proper connection. Once connected, the on-line center can log into the subscribing station using the password data previously obtained at 156, ending the post-checkout subroutine 158.

Figure 5:
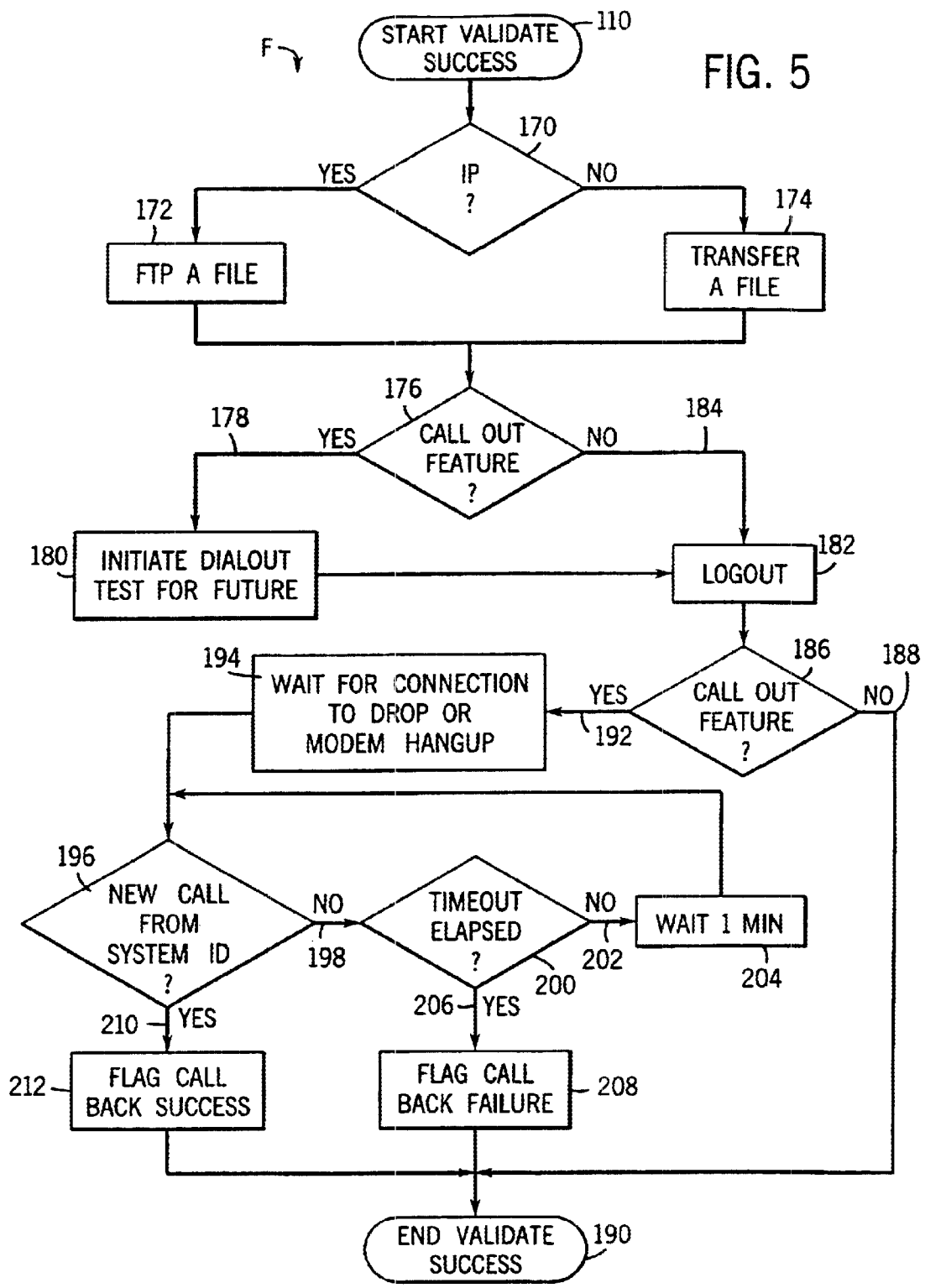
FIG. 5 is a detailed flow chart of a portion of FIG. 2.

Once the on-line center is logged in to the subscribing station, the validate success subroutine F is called 110, FIG. 5., and depending on whether or not the subscribing system is IP based 170, a known stored file is transferred 172, 174, according to the appropriate protocol from the subscribing station to the on-line center in order to verify proper connectivity and configuration of the subscribing station. It is noted that the specific file transferred is not of particular importance, but simply one that is a consistent file on the scanner side so that the on-line center can confirm the correctness and authenticity of the file, and thus, the connection and configuration. Next, if the system is callout enabled 176, 178, a dial out test is initiated at 180 to be initiated after logout at 182. If the system is not callout enabled 176, 184 the on-line center logs off the subscribing station at 182, and follows the logical flow path 186, 188 to end the validate success subroutine at 190. However, if the product is callout enabled 186, 192, a delay is enabled at 194 in order to ensure that the internet or modem connection is disconnected. After which, the system enters into a timed loop to wait for a new call to the on-line center at 196 from the subscribing system, 198 until a predetermined time period passes at 200. As long as the predetermined time period does not pass 200, 202, a delay is initiated at 204 and the system loops back to checking for a call from the on-line center at 196. If the call is not received at 196, 198, and the timeout lapses 200, 206, a failure flag is set at 208 indicating that the call was not received and the valid success subroutine is ended at 190. In a preferred embodiment, the timeout clock at 200 is set at 5–15 minutes, depending on equipment, for appropriate response at 196. Once a call is received at 196, 210 within the predetermined time period, the call-back success flag is set at 212 and the validate success subroutine is ended at 190.

Figure 6:
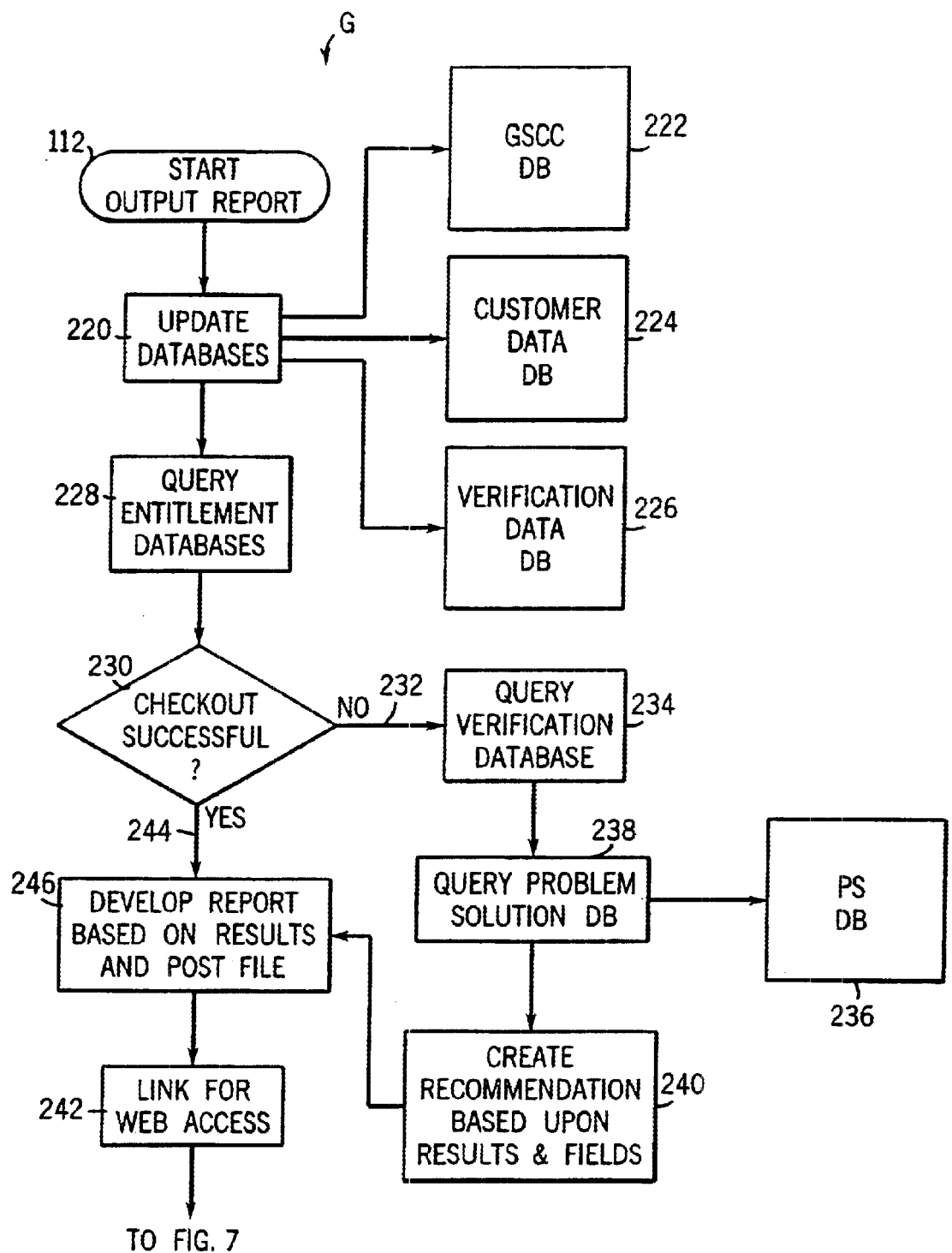
FIG. 6 is a detailed flow chart of a portion of FIG. 2.
Figure 7:
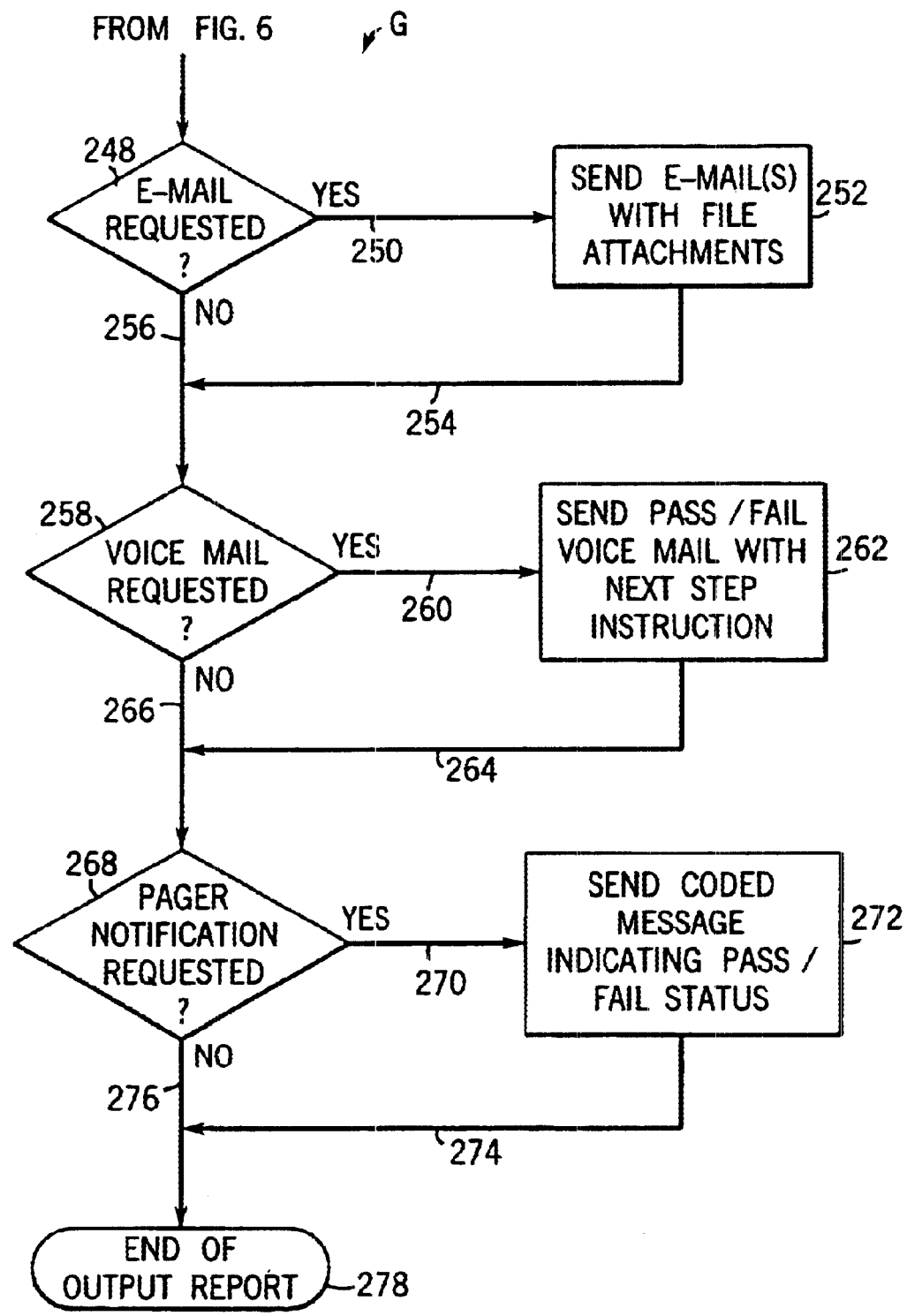
FIG. 7 is a continuation of the flow chart of FIG. 6.

Finally, the output report 112, subsection G of FIG. 2., will now be described in detail with reference to FIGS. 6–7. As an overview, the default for an output report is to post the checkout status to a website for the user/field engineer to access. In addition, the user can request an email notification, a voicemail notification, and/or a page notification to indicate the status of the checkout and that the checkout had been completed. The notification can also include a pass/fail status as well as instructions as to what the user/field engineer should do next. The pager notification may be sent on an electronic pager to indicate the process had been completed and the report is now ready. The pager can indicate a pass/fail as indicated by a numeric code. The webpage report, or email attachment, can indicate the status of the checkout, relevant database fields, and in the case that the checkout was not successful, recommended steps to take by authorized service personnel, which can include field engineers, on-line engineers, administrative staff and so forth. In a preferred embodiment, the present system will include error checking to minimize the number of repeated attempts of any particular subscribing station. Such error checking will include diagnostic information related to telephone and telephone lines, as well as customer equipment. For example, if a fax machine or a human voice answers a call to the product when a modem is expected to pick up, the system will go through a set of error checks such as telephone number authenticity, whether the log in/password combinations were successful, and whether the configuration files loaded correctly, for example.

Upon execution of the subroutine output report 112, the appropriate databases are. updated at 220. For example, an on-line center connectivity database is updated with relevant data 222, as well as a customer data database 224 and a verification data database 226. The connectivity database 222 includes information relating to specific connections between the on-line center and the subscribing station and tells the system how to convert data for electronic communications. The customer data database 224 includes data for a specific customer and the customer's products. The verification data database 226 includes results of the aforementioned tests. Alternatively, the information can be incorporated into a single database, divided into separate databases, or divided in separate virtual databases of a single database.

Next, an entitled database is queried at 228 to ensure that a customer is entitled to use the system and has completed the necessary agreements. If the checkout was successful at 230, 244, a connectivity report is created based on the results and posted to a file at 246. Afterward, a link is established for web access to the report at 242. If the checkout was not successful 230, 232, the verification database is queried to obtain the test results at 234 and a problem/solution database 236 is queried at 238 to find possible solutions to the problems encountered. A problem/solution report is then generated at 240 to include recommendations based upon the problems indicated and the possible solutions at 240. This problem/solution report is then appended to the file created in 246. A link is established for web access at 242. Referring now to FIG. 7, the output report subroutine next generates a status report based on a requested mode of notification. The modes include an email notice, a voice mail notice, a pager notice, or a combination of any of the aforementioned notification nodes. It is contemplated that other modes can be incorporated as requested. In a preferred embodiment, the system first checks to see whether or not an email notification request was received at 248, and if it has 250, then the email is sent with a file attachment of the report at 252. After the email is sent 254, or if an email request was not received 248, 256, a query is made as to whether or not a voicemail notification was requested at 258. If it had 260, a pass/fail voicemail is sent 262 with any necessary instructions for a field engineer to follow. An example of a next step instruction would be to tell the authorized personnel to go to a web page at a specified address or to check email for the report. After the voicemail message has been sent 264, or if a voicemail was not requested in the first instance 258, 266, the pager notification request is queried at 268. If a pager notification was requested 268, 270, a coded message indicating pass or fail status is sent 272 to a pager as requested. After the pager notification is complete 274, or the pager was not requested 268, 276, the output report subroutine is ended at 278 with at least the output report linked for web access 242.

The present system is designed to automatically verify status of communication components for systems subscribing for remote service from an online service center. In general, automatic connectivity verification sequences may be initiated for specific subscriptions, or for all subscribing subsystems. Where the on-line center provides for interactive service arrangements with specific systems, such verification checks may be initiated and carried out on a regular or scheduled basis from the on-line center, or may alternatively be initiated at a subscribing station when servicing.

Accordingly, the present invention includes a communication connectivity initialization and verification system that includes an on-line center having access to service software at a centralized facility so as to service in-field product remotely. The service software includes software for service, upgrades, maintenance, or any other similar type functions, and the servicing of the in-field product includes general servicing, upgrading, maintaining, and repairing, or any other similar type function. The system includes a number of subscribing stations, wherein each subscribing station has a computer operable with an in-field product, such as a medical image scanner. A communications link is provided to selectively connect the on-line center to a subscribing station upon an initiation instruction. Upon connecting the on-line center to one of the subscribing stations via the communications link, the on-line center sends a configuration module to the subscribing station to configure the subscribing station to automatically receive service or maintenance software thereafter. The configuration module is configured, or created, by a processor at the on-line center with input specifying specific customer data and a product profile containing product data. Further, the configuration module causes the subscribing station computer to reconnect to the on-line center after the initial connection and a disconnection to verify connectivity by transferring a data file for error checking at the on-line center. The configuration module causes the computer associated with the in-field product to initiate a dial out test at a predetermined time after the initial disconnection. If a call-back is successful from the subscribing station to the on-line center, within the predetermined time, a success flag is set. If not, a call-back failure flag is set. The on-line center also includes an output report generator and notifier which provides a notification to the authorized personnel that the status report of a connectivity verification process is complete. The authorized personnel selects a mode of notification to include any one of, or a combination of, receiving notification by email, a voicemail, or a pager notification. By default, the report is sent to a web page for downloading by the authorized personnel.

The communication link can include a network of interconnected server nodes, and the subscribing station computer includes a browser program to connect the subscriber station to the network of interconnected server nodes to transfer data from the subscribing stations to the on-line center. The communications link can also include a telephone, telephone network, and an interactive voice recognition server to transfer data between the subscribing station and the on-line center, and can be done remotely from the on-line center or the subscribing station. As previously described, the subscribing station can include a server and the network system can include a number of medical image scanners connected to the server to relay data to and from the on-line center. In one embodiment, the server is a workstation of a medical image scanner arranged to perform both the function of a server and the function of a scanner. If the in-field product is configured to initiate a return call to the on-line center, the configuration file causes the in-field product to make a call back within a predetermined time period after the link to the communication interface is severed.

The present invention also includes a networked system to initiate communication with a field product and configure the field product for future automatic call-backs and includes an on-line center node linked to an on-line center having access to at least one database to store customer data and a processor to create a product/customer configuration module. The networked system includes at least one subscribing station node linked to a field product having operational software associated therewith. A communications interface links the subscribing station to the on-line center to transfer data on demand. Upon initialization and customer data input, customer data is transferred from the subscribing station node through the communication interface and to the on-line center node. After processing by the on-line center, the on-line center sends the product/customer specific configuration module through the communication interface and to the subscribing station node to configure the field product automatically for future automatic communications with the on-line center node. In a preferred embodiment, the field product is a medical device, such as an image scanner, and is configured to communicate and transfer data to the on-line center and receive data from the on-line center through the networked system, without personnel initiation at the subscribing station, in order to identify the medical device and allow the on-line center to update, service, maintain and monitor the medical device and the associated operational software automatically thereafter. The on-line center includes a configuration database having product/customer specific modules therein, and a service database having service modules for the field products therein.

Accordingly, the present invention also includes a computer data signal embodied in a carrier wave and representing a set of instruction which, when executed by one or more processors, causes the one or more processors to run a connectivity initialization, verification, and reporting service on a field product. This is accomplished by first connecting a subscribing station to an on-line center for data transfer and transferring customer data to the centralized on-line center wherein the customer data is processed and a configuration module is created therefrom. Afterward, the configuration module is transmitted to the subscribing station to configure the subscribing station for connectivity verification and to allow future automatic communications. After disconnecting the connection between the on-line center and the subscribing station, the connection is reestablished between the on-line center and the subscribing station to verify valid connectivity. In order to verify a valid connectivity, a known file is transferred from the subscribing station to the on-line center to ensure proper configuration of the subscribing station, and if the subscribing station has a callout feature, a dial out test is initiated. After the on-line center logs off the subscribing station, the on-line center then waits for a call-back from the subscribing station for a predetermined period of time. If the call is received within the prescribed time, a success flag is set, and if the call is not received within the prescribed time, a failure flag is set. The signal further causes the computers to create an output report indicating whether or not the valid connectivity was verified and to notify a user, as requested, that the output report is ready to download. The notification is responsive to a user's request for an email, a voicemail, or a page, or any combination thereof.

Accordingly, the present invention also includes a method of initializing communication with in-field product and verifying connectivity comprising the steps of submitting customer and product data electronically to a centralized on-line center and creating a configuration module at the on-line center based on the submitted customer and product data. The method next includes transmitting the configuration module to a subscribing station having a field product associated therewith and loading the configuration module therein to allow future automatic communications between the on-line center and the subscribing station. After logging off the subscribing station, the system includes automatically initiating a first call-back from the on-line center to the subscribing station and uploading a file therefrom to the on-line center to verify valid connectivity. The method includes initiating a dial out test to be conducted within a predetermined time period after disconnection between the on-line center and the subscribing station if the in-field product is dial out enabled. Thereafter, the on-line center awaits a call-back from the subscribing station for the predetermined time period and sets a success flag if the call-back is received within the predetermined time period, or sets a failure flag if not. A status report is generated and posted indicating the status of the initialization and verification process to a globally accessible network system and the authorized personnel are notified by a selected mode of choice.

According to another aspect of the invention, the invention includes a computer readable storage medium having stored thereon a computer program which, when executed by one or more computers, will cause the one or more computers to retrieve customer and product data electronically in a centralized on-line center and create a configuration module at the on-line center based on the submitted customer and product data. The software then causes the computer to transmit the configuration file to a subscribing station having a field product associated therewith, and then loads the configuration module to allow future automatic communications between the on-line center and the subscribing station. The software further causes the computer to log off the subscribing station and then initiates automatically a first call back from the on-line center to the subscribing station and causes the on-line center to upload a file from the subscribing station to verify valid connectivity. The computer program includes acts to coincide with the steps of the aforementioned process and to implement the aforementioned system.

The present invention has been described in terms of the preferred embodiment, and it is recognized that equivalents, alternatives, and modifications, aside from those expressly stated, are possible and within the scope of the appending claims.

What is claimed is:

1. A communication connectivity initialization and verification system comprising:

at least one on-line center having access to service software at a centralized facility so as to service in-field product remotely;

a plurality of subscribing stations, each having a computer operable with an in-field product;

a communication link connecting the on-line center to a subscribing station upon an initiation instruction;

wherein upon connecting the on-line center to one of the subscribing station via the communication link, the on-line center receives input from the subscribing station specifying customer data and a product profile and sends a configuration module to the subscribing station to configure the subscribing station to automatically receive service/maintenance software thereafter to update operating software of the in-field product automatically; and wherein the configuration module causes the subscribing station computer to reconnect to the on-line center after a disconnection and transfer a data file for error checking at the on-line center and to initiate a test a predetermined time after disconnection; the on-line center flags a call back success if the on-line center receives a call back within the predetermined time, otherwise, flags a call back failure.

2. The system of claim 1 wherein the on-line center further comprises an output report generator and notifier which provides a notification to an authorized personnel that a status report of a connectivity verification process is complete.

3. The system of claim 2 wherein the selects a mode of notification from one of an email notification, a voice mail notification, a pager notification, and a combination thereof.

4. The system of claim 2 wherein the output report generator and notifier posts the status report to a network page so that the authorized personnel can retrieve the status report upon receiving the notification.

5. The system of claim 1 wherein the communications link comprises a network of interconnected server nodes and wherein a subscribing station computer includes a browser program to connect the subscribing station to the network of interconnected server nodes to transfer data from the subscribing stations to the on-line center.

6. The system of claim 1 wherein the communications link comprises a telephone, telephone network, and an interactive voice recognition server to transfer data between the subscribing station and the on-line center.

7. The system of claim 1 wherein the in-field product is a medical image scanner.

8. The system of claim 1 wherein the subscribing station includes a server and wherein the networked system further comprises a plurality of medical image scanners connected to the server to relay data to and from the on-line center.

9. The system of claim 8 wherein the server is a workstation of a medical image scanner arranged to perform a server function in addition to scanner functions.

10. The system of claim 1 wherein the in-field product is configured to initiate a return call to the on-line center after a predetermined time after severing an initial connection to the communications link.

11. A networked system to initiate communication with a field product and configure the field product for future automatic call backs comprising:

an on-line center node linked to an on-line center having access to at least one database to store customer data and a processor to create a product/customer configuration module;

a subscribing station node linked to a field product having operation software associated therewith;

a communication interface connectable to the subscribing station node and the on-line center to transfer data; and wherein upon initialization and customer data input, customer data is transferred from the subscribing station node through the communication interface and to the on-line center node, and after processing by the on-line center, the on-line center sends the product/customer specific configuration module through the communication interface and to the subscribing station node to configure the field product automatically 12. The networked system of claim 11 wherein the communication interface comprises a computer having loaded therein, a browser program to link the subscribing station node to the on-line center node through at least one of a plurality of interconnected server nodes.

13. The networked system of claim 11 wherein the communication interface comprises a computer to link a customer network of subscribing station nodes to the on-line center node through a customer modem connected to the customer network.

14. The networked system of claim 11 wherein the communication interface comprises a telephone and an interactive voice recognition server to link the subscribing station node to the on-line center node.

15. The networked system of claim 11 wherein the field product is a medical image scanner.

16. The networked system of claim 11 wherein the subscribing station node includes a server and wherein the networked system further comprises a plurality of medical image scanners corrected to the server to relay data to and from the on-line center.

17. The networked system of claim 16 wherein the server is a workstation of a medical image scanner arranged to perform a server function in addition to scanner functions.

18. The networked system of claim 11 wherein the field product is configured to initiate a return call to the on-line center after a predetermined time after an initial link to the communication interface is severed.

19. The networked system of claim 11 wherein the field product is a medical device and is configured to communicate and transfer data to the on-line center and receive data from the on-line center through the networked system, without personnel initiation at the subscribing station, to identify the medical device and allow the on-line center to update, service, and maintain the medical device and the associated operation software automatically thereafter.

20. The networked system of claim 11 wherein the on-line center further includes a configuration database having product/customer specific modules therein, and a service database having service modules for the field products therein.

21. A computer data signal embodied in a carrier wave and representing a set of instructions which, when executed by one or more processors, causes the one or more processors to run a connectivity initialization and verification on a field product by:

connecting a subscribing station to an on-line center for data transfer therebetween;

transmitting customer data to the centralized on-line center wherein the customer data is processed and a configuration module is created therefrom;

transmitting the configuration module to the subscribing station to configure the subscribing station for connectivity verification and to allow future automatic communication;

disconnecting the connection between the on-line center and the subscribing station;

reconnecting the connection between the on-line center and the subscribing station; and verifying valid connectivity.

22. The computer data signal of claim 21 wherein the verifying valid connectivity is further defined as:

transferring a known file from the subscribing station to the online center to ensure proper configuration of the subscribing station; and if the subscribing station has a call-out feature, initiating a dial-out test, and after disconnecting a connection between the online center and the subscribing station, waiting for a call back from the subscribing station for a predetermined time period.

23. The computer data signal of claim 21 further causing the act of setting a flag to indicate whether or not a call back was received from the subscribing station within the predetermined time period.

24. The computer data signal of claim 21 wherein the computer data signal further causes the one or more processors to create an output report indicating whether or not valid connectivity was verified.

25. The computer data signal of claim 24 wherein the computer data signal further causes the one or more processors to notify a user that the output report is ready to download.

26. The computer data signal of claim 25 wherein the notification is by one or more of: an email notification, a voice mail notification, and a pager notification.

27. A method of initializing communication with in-field product and verifying connectivity comprising the steps of:

submitting customer and product data electronically to a centralized on-line center;

creating a configuration module at the on-line center based on the submitted customer and product data;

transmitting the configuration module to a subscribing station having field product associated therewith, loading the configuration module therein to allow future automatic communications between the on-line center and the subscribing station to update operating software of the field product, and logging off the subscribing station; and automatically initiating a first call back from the on-line center to the subscribing station and uploading a file therefrom to the on-line center to verify connectivity.

28. The method of claim 27 wherein, if the in-field product is dial-out enabled, further comprising the steps of initiating a dial-out test to be conducted within a predetermined time period after disconnection between the on-line center and the subscribing station.

29. The method of claim 28 further comprising the steps of causing the on-line center to wait for a call back from the subscribing station for the predetermined time period and setting a success flag if the call back is received within the predetermined time period, otherwise setting a failure flag.

30. The method of claim 27 further comprising the step of posting a report indicating a status of the initialization and verification process to a globally accessible network system and notifying an authorized personnel of such posting.

31. The method of claim 30 wherein the step of notifying is further defined as sending at least one of an email notification, a voice mail notification, and a pager notification.

32. The method of claim 31 wherein the notification includes an instructional message.

33. The method of claim 27 wherein the in-field product is a medical scanner and the subscribing station includes a workstation to control the medical scanner and wherein after completion of the initialization and verification process, the workstation and the medical scanner can be upgraded, maintained, serviced, checked, and monitored by the on-line center without field initiation.

34. A computer-readable medium having stored thereon a computer program which, when executed by one or more computers, will cause the one or more computers to:

retrieve customer and product data electronically in an on-line center;

create a configuration module at an on-line center based on the submitted customer and product data;

transmit the configuration module to a subscribing station having a field product associated therewith, load the configuration module therein to allow future automatic communications between the on-line center and the subscribing station to update operating software of the field product, and log off the subscribing station; and automatically initiate a fist call back from the on-line center to the subscribing station and upload a file therefrom to the on-line center to verify connectivity.

35. The computer-readable medium of claim 34 wherein the computer program stored thereon further causes the computer to initiate a dial-out test to be conducted within a predetermined time period after disconnection between the on-line center and the subscribing station, if the in-field product is dial-out enabled.

36. The computer-readable medium of claim 35 wherein the computer program stored thereon further causes the computer to cause the on-line center to wait for a call back from the subscribing station for the predetermined time period and set a success flag if the call back is received within the predetermined time period, otherwise, a failure flag is set.

37. The computer-readable medium of claim 34 wherein the computer program stored thereon further causes the computer to post a report indicating a status of the initialization and verification process to a globally accessible network system and notify an authorized personnel of such posting.

38. The computer-readable medium of claim 37 wherein the notification is further defined to send at least one of an email notification, a voice mail notification, and a pager notification.

39. The computer-readable medium of claim 38 wherein the notification includes an instructional message indicating what further steps are needed of an authorized personnel, if any.

40. The computer-readable medium of claim 34 wherein the in-field product is a medical scanner and the subscribing station includes a workstation to control the medical scanner, and wherein after execution of the computer program, the workstation and the medical scanner can be upgraded, maintained, serviced, checked, and monitored by the on-line center without field initiation.

\* \* \* \* \*

UNITED STATES PATENT AND TRADEMARK OFFICE
CERTIFICATE OF CORRECTION

PATENT NO. : 6,694,367 B1 Page 1 of 1
DATED : February 17, 2004
INVENTOR(S) : Miesbauer et al.

It is certified that error appears in the above-identified patent and that said Letters Patent is hereby corrected as shown below:

<u>Title page</u>,
Item [75], Inventors, delete "Rita-Fontell Diarrassouba" and insert therefor
-- Rita Fontell-Diarrassouba --;

<u>Column 14</u>,
Line 26, insert -- for future automatic communications with the on-line center node to update operating software of the field product automatically. -- after the word "automatically".

Signed and Sealed this

Eleventh Day of May, 2004

JON W. DUDAS
*Acting Director of the United States Patent and Trademark Office*